(12) United States Patent
Seki

(10) Patent No.: US 10,641,396 B2
(45) Date of Patent: May 5, 2020

(54) SEAL RING AND SEALING STRUCTURE

(71) Applicant: NOK CORPORATION, Tokyo (JP)

(72) Inventor: Kazunari Seki, Kitaibaraki (JP)

(73) Assignee: NOK CORPORATION, Tokyo (JP)

( * ) Notice: Subject to any disclaimer, the term of this patent is extended or adjusted under 35 U.S.C. 154(b) by 193 days.

(21) Appl. No.: 15/543,039

(22) PCT Filed: Jun. 18, 2015

(86) PCT No.: PCT/JP2015/067556
§ 371 (c)(1),
(2) Date: Jul. 12, 2017

(87) PCT Pub. No.: WO2016/113923
PCT Pub. Date: Jul. 21, 2016

(65) Prior Publication Data
US 2018/0010692 A1    Jan. 11, 2018

(30) Foreign Application Priority Data

Jan. 14, 2015 (JP) ................................. 2015-005072

(51) Int. Cl.
*F16J 15/34* (2006.01)
*B29C 43/02* (2006.01)
(Continued)

(52) U.S. Cl.
CPC .......... *F16J 15/3496* (2013.01); *B29C 43/02* (2013.01); *B29C 51/08* (2013.01); *F16H 57/029* (2013.01); *F16J 9/20* (2013.01); *F16J 15/441* (2013.01)

(58) Field of Classification Search
CPC ...... F16J 15/34; F16J 15/3404; F16J 15/3408; F16J 15/3412; F16J 15/3416;
(Continued)

(56) References Cited

U.S. PATENT DOCUMENTS 2,462,586 A *  2/1949  Whittingham ............ F16J 9/14
                                                    277/452
2,462,596 A *  2/1949  Bent ........................ F16J 15/32
                                                    277/451
(Continued)

FOREIGN PATENT DOCUMENTS

CN         2121577 U     11/1992
CN       104114915 A     10/2014
(Continued)

OTHER PUBLICATIONS

Chinese Office Action dated May 17, 2018 with English translation (corresponding to CN2017106560405).
(Continued)

*Primary Examiner* — Kristina R Fulton
*Assistant Examiner* — L. Susmitha Koneru
(74) *Attorney, Agent, or Firm* — Harness, Dickey & Pierce, P.L.C.

(57) ABSTRACT

A seal ring and a sealing structure that reduce the deviation of the central axis of the seal ring from the central axis of a shaft thereby preventing the seal ring from abutting against the tip end of a housing in the operation of inserting the shaft in the housing. The seal ring includes a thin part 100A provided in a range less than 180° with respect to a circumferential direction and a thick part 100B, which is configured to protrude inward in the radial direction from an inner peripheral surface of the thin part 100A, the thin part 100A has an abutment joint part 110, and the thick part 100B has, at respective ends of both side surfaces on an inner peripheral surface side thereof, a concave part 120 over an entire range thereof to form a gap between the ends of the both side surfaces and corner parts at both ends of a groove bottom of the annular groove.

8 Claims, 6 Drawing Sheets

(51) Int. Cl.
*B29C 51/08* (2006.01)
*F16J 9/20* (2006.01)
*F16J 15/44* (2006.01)
*F16H 57/029* (2012.01)

(58) Field of Classification Search
CPC .... F16J 15/342; F16J 15/3424; F16J 15/3428;
F16J 15/3432; F16J 9/14; F16J 9/20;
F16J 15/3496
USPC .......................................... 277/452, 497, 499
See application file for complete search history.

(56) References Cited

U.S. PATENT DOCUMENTS

| | | | | |
|---|---|---|---|---|
| 2,569,777 | A * | 10/1951 | Phillips | F16J 9/14 |
| | | | | 277/499 |
| 3,347,555 | A * | 10/1967 | Norton | F16J 15/3204 |
| | | | | 277/448 |
| 4,458,717 | A * | 7/1984 | Boland | F15B 15/223 |
| | | | | 137/496 |
| 5,385,409 | A * | 1/1995 | Ide | F16J 15/3432 |
| | | | | 277/400 |
| 5,879,010 | A * | 3/1999 | Nilkanth | E21B 33/1216 |
| | | | | 277/545 |
| 6,045,135 | A * | 4/2000 | Feistel | F16J 9/16 |
| | | | | 277/434 |
| 6,446,976 | B1 * | 9/2002 | Key | F16J 15/3416 |
| | | | | 277/367 |
| 6,715,767 | B1 * | 4/2004 | Meernik | F16J 9/14 |
| | | | | 277/459 |
| 7,523,944 | B2 * | 4/2009 | Hatori | F16J 15/441 |
| | | | | 277/460 |
| 8,181,972 | B2 * | 5/2012 | Tsuji | F16K 51/02 |
| | | | | 277/641 |
| 8,454,024 | B2 * | 6/2013 | Kakehi | F16J 15/441 |
| | | | | 277/496 |
| 9,206,907 | B2 * | 12/2015 | Nagai | F16J 15/441 |
| 9,314,864 | B2 * | 4/2016 | Budd | B23K 1/0016 |
| 2002/0041071 | A1 * | 4/2002 | Mittler | F16J 9/20 |
| | | | | 277/496 |
| 2006/0055120 | A1 | 3/2006 | Umetsu et al. | |
| 2008/0023919 | A1 | 1/2008 | Umetsu et al. | |
| 2008/0277882 | A1 | 11/2008 | Kyohei et al. | |
| 2010/0001475 | A1 * | 1/2010 | Janian | F16J 15/3212 |
| | | | | 277/460 |
| 2013/0174419 | A1 * | 7/2013 | Meyer | F16J 9/14 |
| | | | | 29/888.074 |
| 2015/0048574 | A1 | 2/2015 | Seki et al. | |
| 2015/0108720 | A1 | 4/2015 | Seki et al. | |
| 2015/0204204 | A1 | 7/2015 | Seki et al. | |

FOREIGN PATENT DOCUMENTS

| | | |
|---|---|---|
| EP | 1536167 A1 | 6/2005 |
| EP | 2453150 A1 | 5/2012 |
| JP | H07-325309 A | 12/1995 |
| JP | H10169782 A | 6/1998 |
| JP | 2005-223630 A | 8/2005 |
| JP | 2006-029349 A | 2/2006 |
| JP | 2008-151201 A | 7/2008 |
| JP | 2012-011646 A | 1/2012 |
| JP | 5382272 B1 | 1/2014 |
| WO | 2003/100301 A1 | 12/2003 |

OTHER PUBLICATIONS

Extended European Search Report dated Aug. 8, 2018 (corresponding to EP 15877875.3).
Communication pursuant to Article 94(3) EPC dated Aug. 19, 2019 (corresponding to EP15877875.3).

* cited by examiner

SEAL RING AND SEALING STRUCTURE

CROSS-REFERENCE TO RELATED APPLICATIONS

This application is a National Stage of International Application No. PCT/JP2015/067556, filed Jun. 18, 2015 (now WO 2018/0010692A1), which claims priority to Japanese Application No. 2015-005072, filed Jan. 14, 2015. The entire disclosures of each of the above applications are incorporated herein by reference.

FIELD

The present disclosure relates to a seal ring and a sealing structure that seal the annular gap between a shaft and the shaft hole of a housing.

BACKGROUND

For example, an Automatic Transmission (AT) or a Continuously Variable Transmission (CVT) for an automobile has a seal ring that is to be attached to an annular groove provided on the outer peripheral surface side of a shaft and seals the annular gap between the shaft and a housing. In such an art, a shaft with a seal ring attached to its annular groove in advance is inserted in a shaft hole provided in a housing.

Here, there is a case that the seal ring could be damaged when the shaft is inserted in the shaft hole. A reason why the seal ring could be damaged will be described with reference to FIG. 9. FIG. 9 is a view for describing the operation of inserting a shaft in a housing in the related art. As described above, a shaft 200 with a seal ring 500 attached to an annular groove 210 in advance is inserted in a shaft hole 310 provided in a housing 300 in a direction indicated by arrow X in the figure. At this time, the seal ring 500 protrudes downward from the outer peripheral surface of the shaft 200 due to its own weight. Therefore, when a lower part Y of the seal ring 500 abuts against the tip end of the housing 300, there is a case that the lower part Y could be damaged. Note that the seal ring 500 is configured to closely adhere to each of the sidewall surface of the annular groove 210 and the inner peripheral surface of the shaft hole 310 to exhibit its sealing function. Therefore, a gap is formed between the inner peripheral surface of the seal ring 500 and the groove bottom of the annular groove 210. Thus, in the operation of inserting the shaft 200 in the shaft hole 310, the seal ring 500 is in a state of suspending from the annular groove 210 due to its own weight, and a central axis CS of the seal ring 500 is positioned below a central axis C of the shaft 200. Accordingly, the seal ring 500 protrudes downward from the outer peripheral front surface of the shaft 200. Note that dotted lines in FIG. 9 indicate the position of the seal ring 500 in a case in which the central axis CS of the seal ring 500 is coincident with the central axis C of the shaft 200.

Here, the interval between the central axis C of the shaft 200 and the central axis CS of the seal ring 500 in the operation greatly depends on the gap between the inner peripheral surface of the seal ring 500 and the groove bottom of the annular groove 210. Therefore, with a reduction in the gap, it becomes possible to narrow the interval between the central axis C and the central axis CS. However, as shown in FIG. 10, because of manufacturing reasons there is a case that corner parts 213 at both ends of the groove bottom of the annular groove 210 are constituted by a curved surface connecting the groove bottom 212 of the annular groove 210 and a groove side surface (sidewall surface 211) to each other. Note that FIG. 10 is a schematic cross-sectional view of a sealing structure provided with a seal ring 500X according to a conventional example. As described above, the seal ring 500 closely adheres to the sidewall surface 211 of the annular groove 210 to exhibit its sealing function. Therefore, it is necessary to prevent the seal ring 500 from contacting the corner parts 213 constituted by the curved surface. Accordingly, when the corner parts 213 constituted by the curved surface are large, it is necessary to expand the gap between the inner peripheral surface of the seal ring 500 and the groove bottom 212 of the annular groove 210.

As a countermeasure for this problem, it is assumed as shown in FIG. 11 to employ an art in which a seal ring 500Y has concave parts 510 at the respective ends of both side surfaces on its inner peripheral surface side. Note that FIG. 11 is a schematic cross-sectional view of a sealing structure provided with the seal ring 500Y according to a conventional example. However, in the case of a resinous seal ring, an abutment joint part is often provided at one position in a circumferential direction thereof in order to enhance the operability of attaching the seal ring to the annular groove 210. In addition, the abutment joint part may have a complicated structure due to its functions or the like. In such a case, the concave parts 510 are not allowed to be provided near the abutment joint part due to their strength, manufacturing processes, or the like.

Note that various materials such as PTFE and PEEK are used for the seal ring, but the PTFE is preferably used in a portion requiring sealing performance. Since the PTFE is relatively soft, the problem in which the seal ring could be damaged becomes more noticeable. In addition, in the case of an AT or a CVT for an automobile, it is possible to confirm damage on a seal ring by examination after the AT or the CVT is assembled. Therefore, the operation of replacing the seal ring becomes very troublesome.

CITATION LIST

Patent Literature

[PTL 1] WO 2003/100301
[PTL 2] Japanese Patent Application Laid-open No. H10-169782
[PTL 3] Japanese Patent Application Laid-open No. 2006-29349

SUMMARY

Technical Problem

It is an object of the present disclosure to provide a seal ring and a sealing structure that reduce the deviation of the central axis of the seal ring from the central axis of a shaft to be allowed to prevent the seal ring from abutting against the tip end of a housing in the operation of inserting the shaft in the housing.

Solution to Problem

The present disclosure employs the following means in order to solve the above described problem.

That is, the present disclosure provides a seal ring made from resin that is to be attached to an annular groove provided on an outer peripheral surface side of a shaft and seals an annular gap between the shaft and a housing, wherein the seal ring seals the annular gap by closely adhering to each of a sidewall surface of the annular groove on a lower pressure side and an inner peripheral surface of a shaft hole of the housing through which the shaft is to be inserted, the seal ring has an abutment joint part at one position in a circumferential direction thereof, the seal ring is constituted by a thin part which is thin in a radial direction thereof and provided in a range less than 180° with respect to the circumferential direction, and a thick part which is thicker in the radial direction than the thin part by being configured to protrude inward in the radial direction from an inner peripheral surface of the thin part, the abutment joint part is provided in the thin part, and the thick part has, at respective ends of both side surfaces on an inner peripheral surface side thereof, a concave part over an entire range to form a gap between the ends of the both side surfaces and corner parts at both ends of a groove bottom of the annular groove.

In addition, the present disclosure provides a sealing structure comprising: a shaft provided with an annular groove on an outer peripheral surface side thereof; a housing having a shaft hole through which the shaft is to be inserted; and a seal ring made from resin that closely adheres to each of a sidewall surface of the annular groove on a lower pressure side and an inner peripheral surface of the shaft hole to seal an annular gap between the shaft and the housing and has an abutment joint part at one position in a circumferential direction thereof, wherein the seal ring is constituted by a thin part which is thin in a radial direction thereof and provided in a range less than 180° with respect to the circumferential direction and a thick part, which is configured to protrude inward in the radial direction from an inner peripheral surface of the thin part, to be thicker in the radial direction than the thin part, the abutment joint part is provided in the thin part, and the thick part has, at respective ends of both side surfaces on an inner peripheral surface side thereof, a concave part over an entire range thereof to form a gap between the ends of the both side surfaces and corner parts at both ends of a groove bottom of the annular groove.

According to the present disclosure, the seal ring is constituted by the thin part and the thick part, and the thin part is provided in the range less than 180° with respect to the circumferential direction. Thus, in the operation of inserting the shaft in the housing, the inner peripheral surface of the thick part of the seal ring is brought into contact with the groove bottom of the annular groove provided on the shaft. In addition, the thick part has, at the respective ends of both side surfaces on the inner peripheral surface side, the concave part over its entire range to form the gap between the ends of the both side surfaces and the corner parts at both ends of the groove bottom of the annular groove. Accordingly, since the close adhesion of the seal ring to the sidewall surfaces of the annular groove is not prevented, it becomes possible to reduce, while keeping sealing performance, the deviation of the central axis of the seal ring from the central axis of the shaft in the operation of inserting the shaft in the housing by an increase in the thickness of the thick part. In addition, since the thin part has the abutment joint part, the structure of the abutment joint part causes no problem in forming the concave parts.

Here, the corner parts at the both ends of the groove bottom of the annular groove may be constituted by a curved surface connecting the groove bottom of the annular groove and a groove side surface to each other, and both RA>RC, and

RBX>RC>RB>RD may be satisfied, where
RA is a curvature radius of the inner peripheral surface of the thin part,
RB is a curvature radius of the inner peripheral surface of the thick part, RBX is a curvature radius of a largest region in the radial direction of a portion in which the concave parts are provided,
RC is half an outer diameter of a largest region in the radial direction of the corner parts constituted by the curved surface, and
RD is half an outer diameter of the groove bottom of the annular groove.

Thus, a gap can be formed between the corner parts at both ends (constituted by a curved surface) of the groove bottom of the annular groove and the concave parts, and the deviation of the central axis of the seal ring from the central axis of the shaft can be reduced by an increase in the thickness of the thick part in the radial direction.

The abutment joint part may be cut off in a staircase pattern when seen from both an outer peripheral surface side thereof and both sidewall surface sides thereof, thereby providing, a first fitting convex part and a first fitting concave part on the outer peripheral surface side on one side across the cutting part and a second fitting concave part in which the first fitting convex part is to be fitted and a second fitting convex part that is to be fitted in the first fitting concave part on the outer peripheral surface side on the other side across the cutting part. In addition, the concave parts may be formed by heat pressing.

Advantageous Effects of the Disclosure

As described above, according to the present disclosure, it is possible to reduce the deviation of the central axis of a seal ring from the central axis of a shaft to prevent the seal ring from abutting against the tip end of a housing in the operation of inserting the shaft in the housing.

DRAWINGS

DETAILED DESCRIPTION

Hereinafter, with reference to the drawings, a mode for carrying out the present disclosure will be illustratively described in detail based an embodiment. However, dimensions, materials, shapes, their relative arrangements, or the like of constituents described in the embodiment do not intend to limit the scope of the present disclosure unless otherwise specifically described.

Embodiment

A seal ring and a sealing structure according to the embodiment of the present disclosure will be described with reference to FIGS. 1 to 8. Note that the seal ring and the sealing structure according to the embodiment are used for the purpose of sealing the annular gap between a shaft and a housing that rotate relative to each other to maintain hydraulic pressure in a transmission such as an AV or a CVT for an automobile. In addition, in the following description, a "higher pressure side" indicates a side where pressure becomes higher when differential pressure is generated between both sides of the seal ring, whereas a "lower pressure side" indicates a side where the pressure becomes lower when the differential pressure is generated between both sides of the seal ring.

(Seal Ring)

Figure 1:
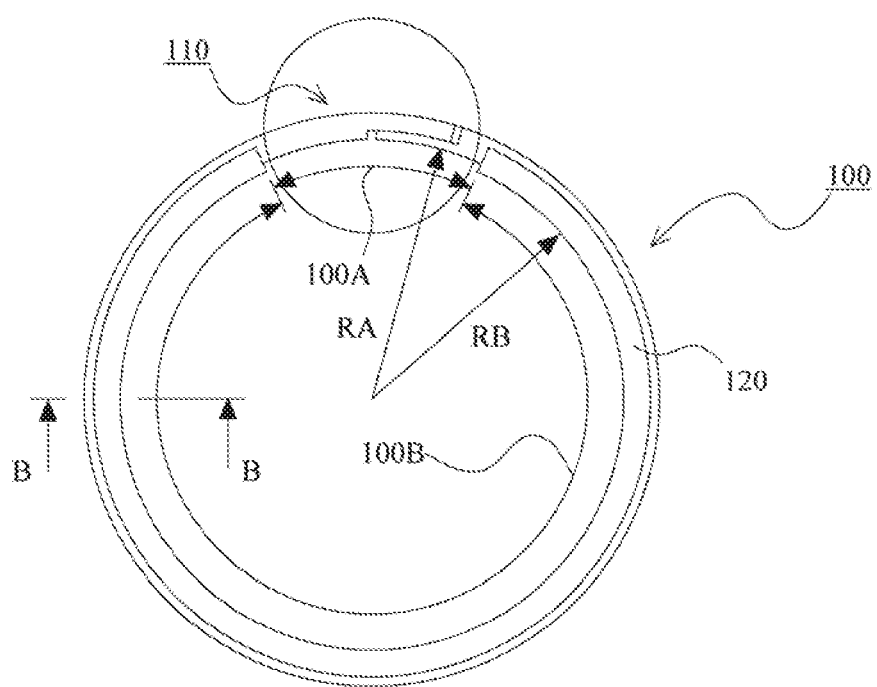
FIG. 1 is a side view of a seal ring according to an embodiment of the present disclosure.
Figure 2:
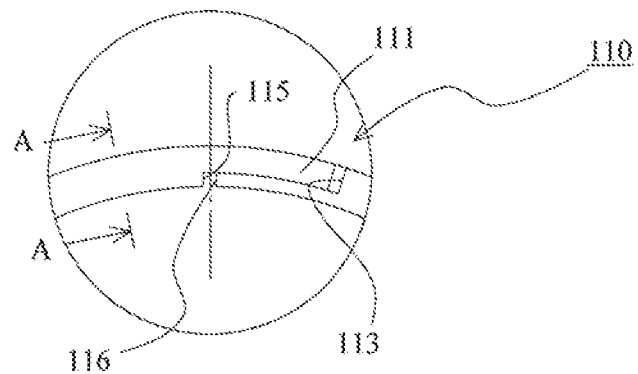
FIG. 2 is a partially enlarged view of the side view of the seal ring according to the embodiment of the present disclosure.
Figure 3:
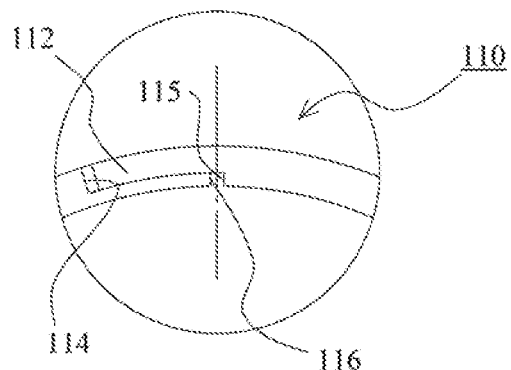
FIG. 3 is a partially enlarged view of the side view of the seal ring according to the embodiment of the present disclosure.
Figure 4:
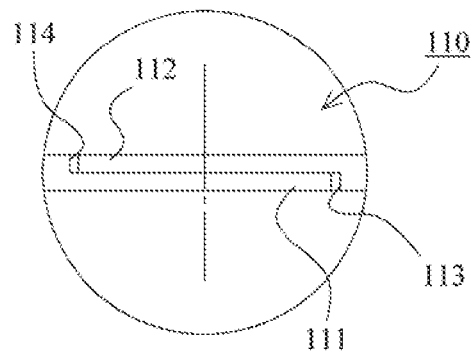
FIG. 4 is a partially enlarged view of the seal ring according to the embodiment of the present disclosure when seen from its outer peripheral surface side.
Figure 5:
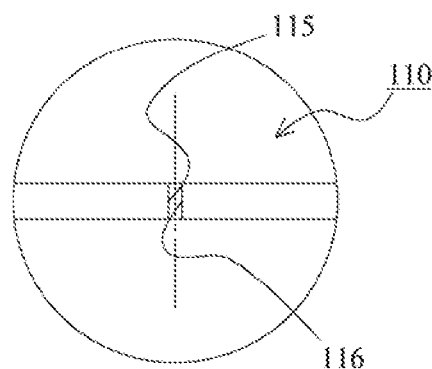
FIG. 5 is a partially enlarged view of the seal ring according to the embodiment of the present disclosure when seen from its inner peripheral surface side.

A seal ring 100 according to the embodiment will be described with particular reference to FIGS. 1 to 5. FIG. 1 is a side view of the seal ring according to the embodiment of the present disclosure. FIG. 2 is a partially enlarged view of the side view of the seal ring according to the embodiment of the present disclosure in which a part surrounded by a circle in FIG. 1 is enlarged. FIG. 3 is a partially enlarged view of the side view of the seal ring according to the embodiment of the present disclosure in which the opposite-side surface of the part surrounded by the circle in FIG. 1 is enlarged. FIG. 4 is a partially enlarged view of the seal ring according to the embodiment of the present disclosure when seen from its outer peripheral surface side in which the part surrounded by the circle in FIG. 1 is seen from the outer peripheral surface side. FIG. 5 is a partially enlarged view of the seal ring according to the embodiment of the present disclosure when seen from its inner peripheral surface side in which the part surrounded by the circle in FIG. 1 is seen from the inner peripheral surface side.

Figure 6:
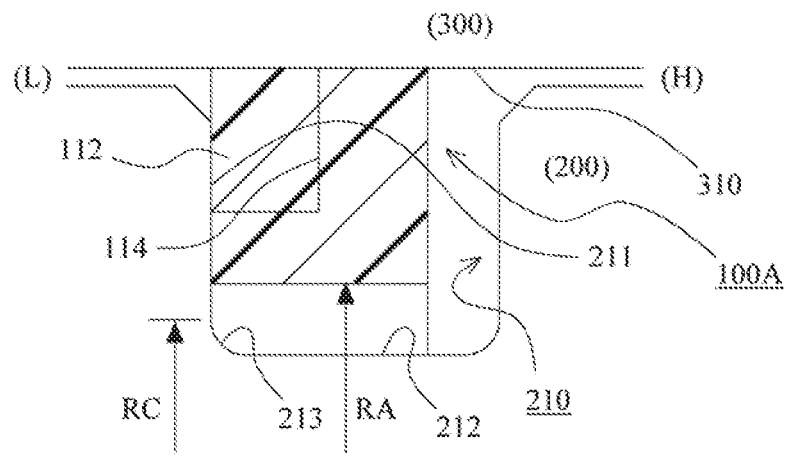
FIG. 6 is a schematic cross-sectional view of a sealing structure according to the embodiment of the present disclosure.
Figure 7:
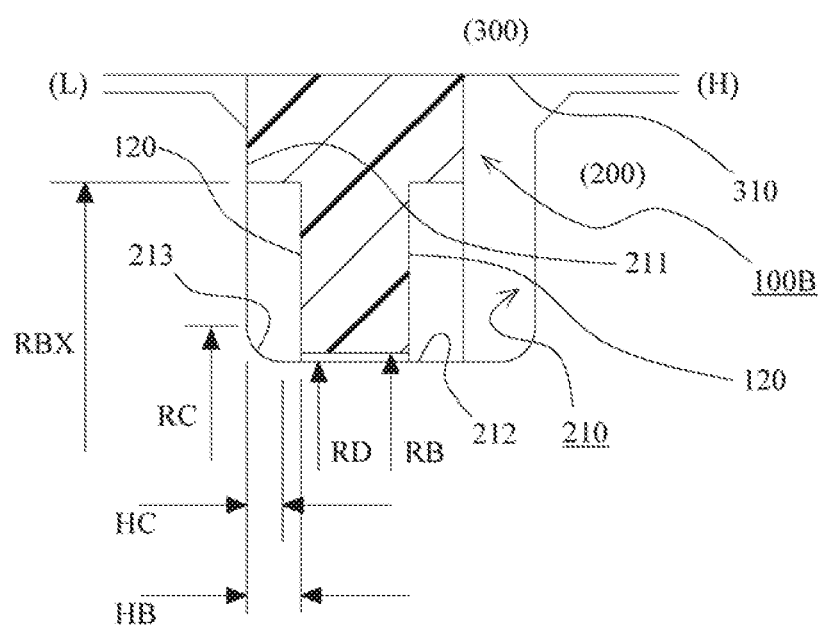
FIG. 7 is a schematic cross-sectional view of the sealing structure according to the embodiment of the present disclosure.

The seal ring 100 according to the embodiment is attached to an annular groove 210 provided on the outer peripheral surface side of a shaft 200. Further, the seal ring 100 seals the annular gap between the shaft 200 and a housing 300 (the inner peripheral surface of a shaft hole 310 in which the shaft 200 is to be inserted in the housing 300) that rotate relative to each other (see FIGS. 6 and 7). Thus, the seal ring 100 maintains fluid pressure in a sealing target region in which the fluid pressure (hydraulic pressure in the embodiment) is configured to change. Here, in the embodiment, fluid pressure in a right region in FIGS. 6 and 7 is configured to change, and the seal ring 100 plays a role in maintaining the fluid pressure in the sealing target region on the right side of FIGS. 6 and 7. Note that the fluid pressure in the sealing target region is low and no load is generated when the engine of an automobile is stopped, whereas the fluid pressure in the sealing target region becomes high when the engine is started.

The seal ring 100 according to the embodiment is constituted by a polytetrafluoroethylene (PTFE) annular member. The seal ring 100 has an abutment joint part 110 at one position in its circumferential direction. In addition, the seal ring 100 is constituted by a thin part 100A thin in its radial direction and a thick part 100B configured to protrude inward in the radial direction from the inner peripheral surface of the thin part 100A to be thicker in the radial direction than the thin part 100A. Accordingly, when seen from its side surface side, the seal ring 100 has an outer peripheral surface formed in a circular shape and has an inner peripheral surface stepped in the radial direction. Note that 100A and 100B in the figures indicate a range in which the thin part is provided and a range in which the thick part is provided, respectively. The thin part 100A is provided in a range less than 180° with respect to the circumferential direction. Further, the thin part 100A has the abutment joint part 110. In addition, the thick part 100B has, at the respective ends of both side surfaces on the inner peripheral surface side, concave parts 120 over its entire range. The pair of concave parts 120 is provided to form the gap between the pair of concave parts 120 and corner parts 213 at both ends of the groove bottom of the annular groove 210 (see FIG. 7). Note that the concave parts 120 according to the embodiment are configured so as to have a rectangle-shaped cross section.

Such a pair of concave parts 120 makes the thick part 100B have a T-shaped cross section (see FIG. 7) while making the thin part 100A have a rectangle-shaped cross section (see FIG. 6). Note that the seal ring 100 can be obtained by being molded with a die. The abutment joint part 110 may be formed by molding or cutting. Further, the concave parts 120 are preferably formed by heat pressing in which the concave parts 120 are pressed while being heated (see Japanese Patent Application Laid-open No. 2012-11646). Thus, complicated working with machining becomes unnecessary, and the concave parts 120 can be easily formed in a fewer processing operations. In addition, the dimensional accuracy of parts where the concave parts 120 are to be formed can be enhanced, and influence on the dimensional accuracy of parts where pressing is not implemented can be reduced.

The configuration of the abutment joint part 110 according to the embodiment will be described with particular reference to FIGS. 2 to 5. The abutment joint part 110 according to the embodiment employs a special step cut with which the abutment joint part 110 is cut off in a staircase pattern when seen from both the outer peripheral surface side and the both sidewall surface sides. Thus, in the seal ring 100, a first fitting convex part 111 and a first fitting concave part 114 are provided on the outer peripheral surface side on one side across a cutting part, whereas a second fitting concave part 113 in which the first fitting convex part 111 is to be fitted and a second fitting convex part 112 that is to be fitted in the first fitting concave part 114 are provided on the outer peripheral surface side on the other side across the cutting part. Note that an end surface 115 on the inner peripheral surface side on the one side and an end surface 116 on the inner peripheral surface side on the other side face each other across the cutting part. The special step cut is a known art, and thus its detailed description will be omitted. However, the special step cut has the property of maintaining its stable sealing performance even if the circumferential length of the seal ring 100 changes due to its thermal expansion/contraction. Note that the "cutting part" includes not only a case in which the cutting part is cut off by cutting but also a case in which the cutting part is obtained by molding.

(Sealing Structure)

The sealing structure according to the embodiment will be described with particular reference to FIGS. 6 and 7. FIGS. 6 and 7 are schematic cross-sectional views of the sealing structure according to the embodiment of the present disclosure, the seal ring 100 in FIG. 6 being a cross-sectional view taken along line A-A in FIG. 2, the seal ring 100 in FIG. 7 being a cross-sectional view taken along line B-B in FIG. 1. FIGS. 6 and 7 show a state in which the engine is started to make the fluid pressure in the right region become higher than the fluid pressure in the left region via the seal ring 100. In this state, the seal ring 100 closely adheres to each of a sidewall surface 211 of the annular groove 210 on the lower pressure side and the inner peripheral surface of the shaft hole 310 of the housing 300 to seal the annular gap between the shaft 200 and the housing 300.

(Dimensional Relationship between Seal Ring and Annular Groove)

The dimensional relationship between the seal ring 100 and the annular groove 210 with no external force applied thereto will be described in detail. The corner parts 213 at both ends of the groove bottom of the annular groove 210 are constituted by a curved surface connecting the groove bottom 212 of the annular groove 210 and a groove side surface (the sidewall surface 211) to each other. Here, it is assumed that the curvature radius of the inner peripheral surface of the thin part 100A is RA and the curvature radius of the inner peripheral surface of the thick part 100B is RB in the seal ring 100. In addition, it is assumed that the curvature radius of the largest region in the radial direction of a portion in which the concave parts 120 are provided is RBX and the width of the concave parts 120 in its axis direction is HB in the seal ring 100. Further, in the annular groove 210, it is assumed that half the outer diameter of the largest region in the radial direction of the corner parts 213 constituted by the curved surface is RC, the width of the corner parts 213 is HC, and half the outer diameter of the groove bottom 212 is RD.

The seal ring 100 is so designed that any of RA>RC, RBX>RC>RB>RD, and HB>HC is satisfied. When RA>RC is satisfied, the side surfaces of the thin part 100A are prevented from contacting the corner parts 213 of the annular groove 210. When RBX>RC and HB>HC are satisfied, the side surfaces of the thick part 100B are also prevented from contacting the corner parts 213 of the annular groove 210. Accordingly, the side surfaces of the seal ring 100 are prevented from contacting the corner parts 213 over its entire range. That is, the side surfaces of the seal ring 100 contact the sidewall surfaces 211 of the annular groove 210 over the entire range. Moreover, when RC>RB>RD is satisfied, the thick part 100B can be thickened while preventing the seal ring 100 from contacting the corner parts 213.

(Operation of Inserting Shaft in Housing)

Figure 8:
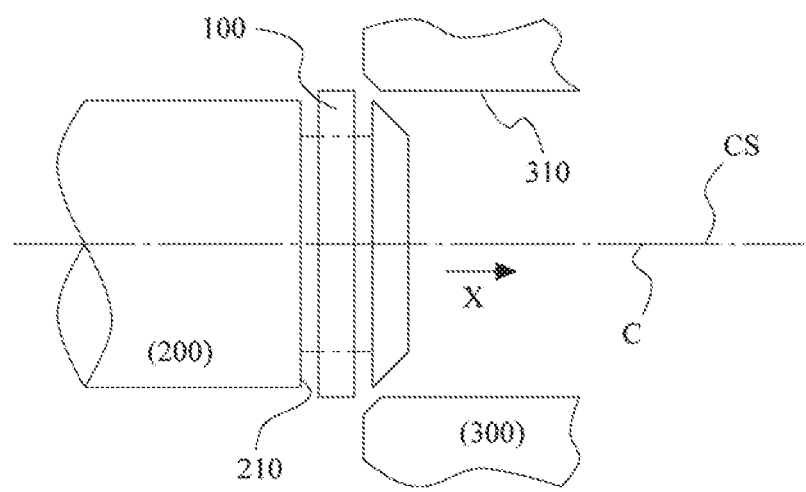
FIG. 8 is a view for describing the operation of inserting a shaft in a housing in the embodiment of the present disclosure.
Figure 9:
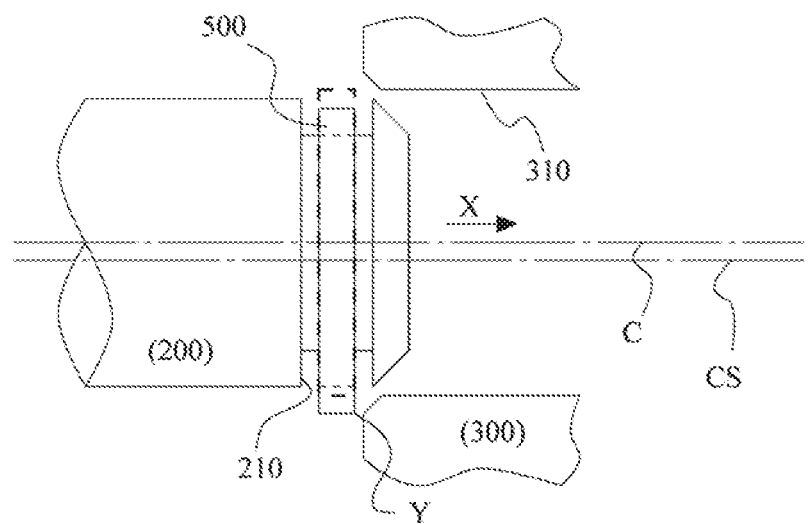
FIG. 9 is a view for describing the operation of inserting a shaft in a housing in the related art.
Figure 10:
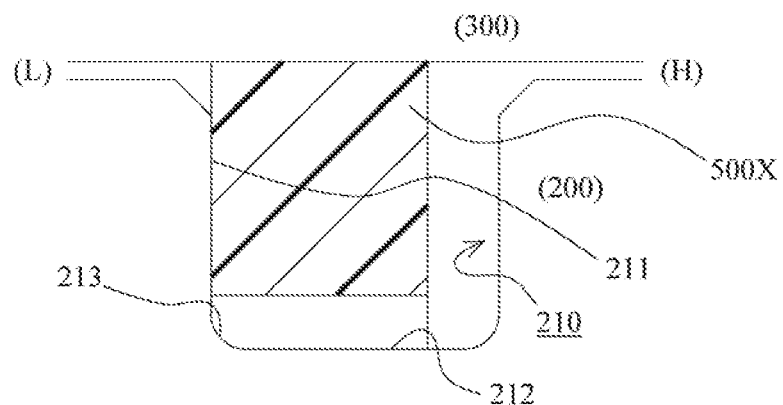
FIG. 10 is a schematic cross-sectional view of a sealing structure provided with a seal ring according to a conventional example.
Figure 11:
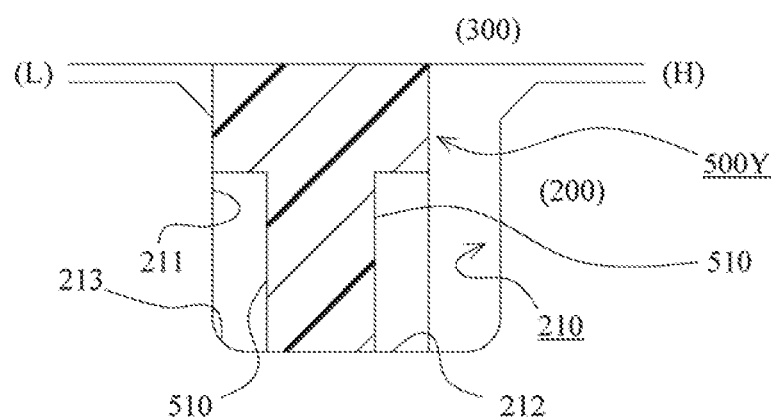
FIG. 11 is a schematic cross-sectional view of a sealing structure provided with a seal ring according to a conventional example.

The operation of inserting the shaft in the housing according to the embodiment will be described with particular reference to FIG. 8. FIG. 8 is a view for describing the operation of inserting the shaft in the housing in the embodiment. The shaft 200 with the seal ring 100 attached to the annular groove 210 in advance is inserted in the shaft hole 310 provided in the housing 300 in a direction indicated by arrow X in the figure. In the embodiment, the inner peripheral surface of the thick part 100B is brought into contact with the groove bottom 212 of the annular groove 210. Therefore, in the inserting operation, a central axis C of the shaft 200 and a central axis CS of the seal ring 100 can be made almost coincident with each other.

(Excellent Point of Sealing Device According to Embodiment)

According to the embodiment, the seal ring 100 is constituted by the thin part 100A and the thick part 100B and the thin part 100A is provided in a range less than 180° with respect to the circumferential direction. Thus, in the operation of inserting the shaft 200 in the housing 300, the inner peripheral surface of the thick part 100B of the seal ring 100 is brought into contact with the groove bottom 212 of the annular groove 210 provided on the shaft 200. In addition, the thick part 100B has, at the respective ends of both side surfaces on the inner peripheral surface side, the concave part 120 over its entire range to form the gap between the ends of the side surfaces and the corner parts 213 at both ends of the groove bottom of the annular groove 210. Accordingly, since the close adhesion of the seal ring 100 to the sidewall surfaces 211 of the annular groove 210 is not disturbed, it becomes possible to reduce, while maintaining sealing performance, the deviation of the central axis CS of the seal ring 100 from the central axis C of the shaft 200 in the operation of inserting the shaft 200 in the housing 300 with an increase in the thickness of the thick part 100B. Thus, in the inserting operation, the seal ring 100 can be prevented from protruding downward from the outer peripheral front surface of the shaft 200. Accordingly, the seal ring 100 can be prevented from colliding against the tip end of the housing 300 and can be prevented from being damaged.

Here, when RB=RD is established, the central axis C of the shaft 200 and the central axis CS of the seal ring 100 become theoretically completely coincident with each other. However, in order to make the outer peripheral surface of the seal ring 100 closely adhere to the inner peripheral surface of the shaft hole 310, it is necessary to apply fluid pressure onto the inner peripheral surface of the seal ring 100. Therefore, it is necessary to establish RB>RD. However, it is desirable to minimize the difference between RB and RD to make the central axis C and the central axis CS become coincident with each other to a greater extent.

In addition, since the thin part 100A has the abutment joint part 110 in the embodiment, the structure of the abutment joint part 110 poses no problem in forming the concave parts 120. Accordingly, even if a specific step having a relatively complicated structure is employed as the abutment joint part 110 like the embodiment, the formation of the concave parts 120 is not hindered.

(Other)

The embodiment describes a case in which the seal ring 100 is made of PTFE. However, the material of the seal ring according to the present disclosure is not limited to PTFE, and other resin materials can be used. Since the seal ring can be prevented from being damaged resulting from abutting against the housing in the present disclosure, the present disclosure is particularly effective for a case in which a soft resin material is employed.

In addition, the embodiment describes a case in which the abutment joint part is the special step cut. However, the present disclosure is not limited to the abutment joint part of the special step cut, and can also employ abutment joint parts having other structures. Since the concave parts are not necessarily provided at the abutment joint part, the present disclosure is particularly effective for a case in which an abutment joint part having a complicated structure that makes the formation of concave parts difficult is employed.

Moreover, the embodiment describes a case in which the concave parts 120 are configured so as to have a rectangle-shaped cross section. However, the shape of the concave parts according to the present disclosure is not limited so long as it is possible to form the gaps between the concave parts and the corner parts 213 at both ends of the groove bottom of the annular groove 210. For example, the concave parts may be formed in such a manner as to make both side surfaces of the thick part tapered on the inner peripheral surface side so that the width of the thick part of the seal ring becomes narrower from the outer peripheral surface side to the inner peripheral surface side in the axis direction. That is, the concave parts may be configured so as to have a triangle-shaped cross section.

REFERENCE SIGNS LIST

100 Seal ring
100A Thin part
100B Thick part
110 Abutment joint part
111 First fitting convex part
112 Second fitting convex part
113 Second fitting concave part
114 First fitting concave part
115 End surface
116 End surface
120 Concave part
200 Shaft
210 Annular groove
211 Side wall surface
212 Groove bottom
213 Corner part
300 Housing
310 Shaft hole

The invention claimed is:

1. A seal ring made from resin that is to be attached to an annular groove provided on an outer peripheral surface side of a shaft and seals an annular gap between the shaft and a housing, wherein
the seal ring seals the annular gap by closely adhering to each of a sidewall surface of the annular groove on a lower pressure side and an inner peripheral surface of a shaft hole of the housing through which the shaft is to be inserted,
the seal ring has an abutment joint part at one position in a circumferential direction thereof,
the seal ring is constituted by a thin part which is thin in a radial direction thereof and provided in a range less than 180° with respect to the circumferential direction, and a thick part which is thicker in the radial direction than the thin part by being configured to protrude inward in the radial direction from an inner peripheral surface of the thin part,
the abutment joint part is provided in the thin part, and
the thick part has, at respective ends of both side surfaces on an inner peripheral surface side thereof, a concave part over an entire range to form a gap between the ends of the both side surfaces and corner parts at both ends of a groove bottom of the annular groove, wherein
the corner parts at the both ends of the groove bottom of the annular groove are constituted by a curved surface connecting the groove bottom of the annular groove and a groove side surface to each other, and
both RA>RC and RBX>RC>RB>RD are satisfied, where
RA is a curvature radius of the inner peripheral surface of the thin part,
RB is a curvature radius of the inner peripheral surface of the thick part,
RBX is a curvature radius of a largest region in the radial direction of a portion in which the concave parts are provided,
RC is half an outer diameter of a largest region in the radial direction of the corner parts constituted by the curved surface, and
RD is half an outer diameter of the groove bottom of the annular groove.

2. The seal ring according to claim 1, wherein
the abutment joint part is cut off in a staircase pattern when seen from both an outer peripheral surface side thereof and both sidewall surface sides thereof, thereby providing, a first fitting convex part and a first fitting concave part on the outer peripheral surface side on one side across the cutting part and a second fitting concave part in which the first fitting convex part is to be fitted and a second fitting convex part that is to be fitted in the first fitting concave part on the outer peripheral surface side on the other side across the cutting part.

3. The seal ring according to claim 1, wherein the concave parts are formed by heat pressing.

4. The seal ring according to claim 2, wherein the concave parts are formed by heat pressing.

5. A sealing structure comprising:
a shaft provided with an annular groove on an outer peripheral surface side thereof;
a housing having a shaft hole through which the shaft is to be inserted; and
a seal ring made from resin which seals an annular gap between the shaft and the housing by closely adhering to each of a sidewall surface of the annular groove on a lower pressure side and an inner peripheral surface of the shaft hole and which has an abutment joint part at one position in a circumferential direction thereof, wherein
the seal ring is constituted by a thin part which is thin in a radial direction thereof and provided in a range less than 180° with respect to the circumferential direction, and a thick part which is thicker in the radial direction than the thin part by being configured to protrude inward in the radial direction from an inner peripheral surface of the thin part,
the abutment joint part is provided in the thin part, and
the thick part has, at respective ends of both side surfaces on an inner peripheral surface side thereof, a concave part over an entire range thereof to form a gap between the ends of the both side surfaces and corner parts at both ends of a groove bottom of the annular groove, wherein
the corner parts at the both ends of the groove bottom of the annular groove are constituted by a curved surface connecting the groove bottom of the annular groove and a groove side surface to each other, and
both RA>RC and RBX>RC>RB>RD are satisfied, where
RA is a curvature radius of the inner peripheral surface of the thin part,
RB is a curvature radius of the inner peripheral surface of the thick part,
RBX is a curvature radius of a largest region in the radial direction of a portion in which the concave parts are provided,
RC is half an outer diameter of a largest region in the radial direction of the corner parts constituted by the curved surface, and
RD is half an outer diameter of the groove bottom of the annular groove.

6. The sealing structure according to claim 5, wherein the abutment joint part is cut off in a staircase pattern when seen from both an outer peripheral surface side thereof and both sidewall surface sides thereof, thereby providing, a first fitting convex part and a first fitting concave part on the outer peripheral surface side on one side across the cutting part and a second fitting concave part in which the first fitting convex part is to be fitted and a second fitting convex part that is to be fitted in the first fitting concave part on the outer peripheral surface side on the other side across the cutting part.

7. The sealing structure according to claim 5, wherein the concave parts are formed by heat pressing.

8. The sealing structure according to claim 6, wherein the concave parts are formed by heat pressing.

\* \* \* \* \*